Dec. 5, 1967 J. GROSVALET 3,355,935
SEMICONDUCTOR SYSTEMS FOR MEASURING STRESSES
Filed July 24, 1963

Inventor
Jean Grosvalet
By Cushman, Darby & Cushman
Attorneys

United States Patent Office 3,355,935
Patented Dec. 5, 1967

3,355,935
SEMICONDUCTOR SYSTEMS FOR
MEASURING STRESSES
Jean Grosvalet, Paris, France, assignor to CSF-Compagnie Generale de Telegraphie Sans Fil, a corporation of France
Filed July 24, 1963, Ser. No. 297,267
Claims priority, application France, July 25, 1962, 905,004
5 Claims. (Cl. 73—88.5)

The present invention relates to semiconductor devices for measuring stresses. More particularly it is an object of the invention to provide a stress measuring system using a field effect structure.

It is known that such structures, which may be formed in various ways, are characterized by a conducting channel in which majority carriers move under the action of an electric field or in response to any other suitable energy source. This channel is bounded by the space charge created by an electric field produced from one or more grids or gates, and the carriers which move along it pass from an emitting electrode, or source, to a collector electrode or drain.

The applicant has discovered that, in such a structure, variations in carrier concentration brought about by the application of a stress cause larger current variations than are produced, under the same conditions, in a homogeneous bar of semiconducting material.

This remarkable property may be explained by the fact that the carriers have reached their limit speed in the field effect structure, whereas such is not the case for a homogeneous semiconductor element.

For the same reason, the drift of the proportionality coefficient between current variations and the stresses applied on the element is less when this element has a field effect structure.

The field effect structures are particularly well suited for the measuring of stresses with a high sensitivity, as will be seen in the following description.

In the appended drawing.

Figure 1:
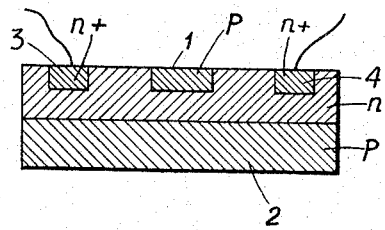
FIG. 1 shows schematically a field effect element adapted to be mounted as a stress gauge.

The diffused layer linear structure shown in FIG. 1 consists essentially of gates 1 and 2, a source 3 and a drain 4 of type $n+$.

Such a structure can be soldered directly without the use of glue on a metal part (not shown), to which the stress to be measured is applied, which cannot be done with a homogeneous semiconductor bar used as a stress gauge.

Figure 2:
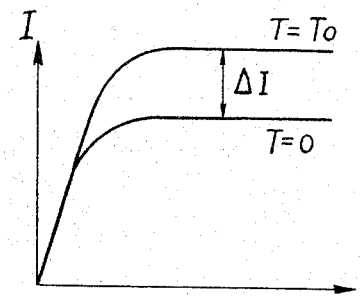
FIG. 2 shows the current I generated by such an element as a function of the voltage V across its terminals for different stresses or strain.

FIG. 2 shows the current-voltage characteristic of a typical field effect structure for different stresses applied thereto—that is, the current I generated by such an element as a function of the voltage V across its terminals 3 and 4, for a strain $T=0$ and for a strain $T=T_0$.

It will be realized that such a characteristic permits measuring $\Delta I$ with load impedances which may be high— that is, when operating above the knee of the characteristic curve, current changes are due mainly to stress changes and not terminal voltage changes and since terminal voltage changes reflect load impedance changes, the current changes are sizable even with high load impedances.

Figure 3:
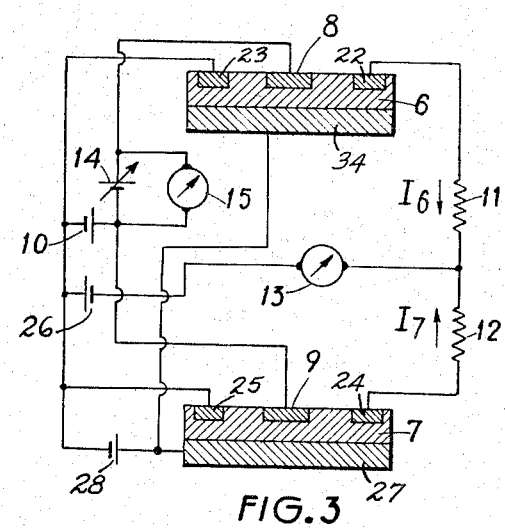
FIGS. 3 and 4 show circuit arrangements for measuring stresses.

The arrangement shown in FIG. 3 consists essentially of two field effect elements 6 and 7, preferably substantially identical, whose gates 8 and 9 are biased by a common voltage source 10. A biasing voltage is applied to the terminals 22 and 23 of element 8 and terminals 24 and 25 from a common voltage source 26. The gates 34 and 27 may be biased by a common voltage source 28; this battery connection is an embodiment of the usual manner in which the gates 27 and 34 are necessarily biased with respect to the source, as is well known in the field effect transistor technique (see for example, page 346 of "Transistor" by Milton S. Kiver, edited by McGraw-Hill in 1962).

The drains 22 and 24 of elements 6 and 7 are respectively loaded by two resistances 11 and 12 which are preferably equal. The difference between currents $I_6$ and $I_7$, flowing through these resistances, is measured by means of a milliammeter 13.

In the absence of any stress applied to elements 6 and 7, this difference may be readily cancelled, if necessary by means of an additional adjustable bias, obtained from a source 14, which is applied to one of gates 8 or 9.

When stresses are applied to elements 6 and 7, or to one of them, the difference between these stresses brings about a variation of the difference between currents $I_6$ and $I_7$. This difference is cancelled and the "zero" of milliammeter 13 is reestablished, by varying the voltage at the terminals of source 14. This voltage variation, which is proportional to the difference between the stresses to be measured, is shown by a meter 15.

Figure 4:
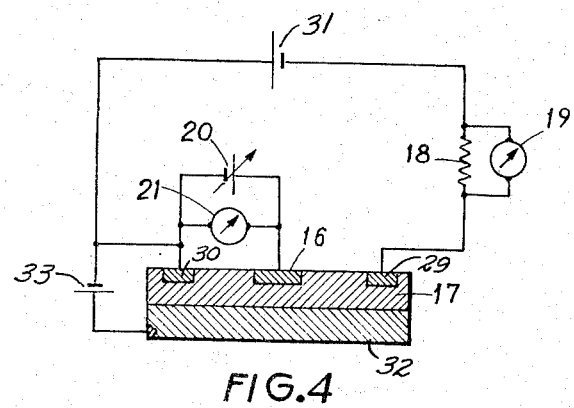

A simpler arrangement is shown in FIG. 4. Biasing voltage for the terminals 29 and 30 is applied from voltage source or energizing source 31. Gating voltages for gates 16 and 32 are respectively applied from voltage sources 20 and 33. Source 33 is connected to gate 32 by means of a lead which is soldered to gate 32, as shown by a cross hatching at the left hand corner of the gate 32. The current flowing in element 17 in the absence of any stress is measured at the terminals of a resistance 18 by a zero-reading device 19. The applied stress is measured by bringing the value of the current back to zero by means of the variable potential applied to gate 16, by a source 20 and reading the variation of this potential on a voltmeter 21.

This variation is equal to the quotient of the variation of the current by the transconductance of the element, so that the circuit sensitivity is fairly high.

The term "stress," of course, also covers any physical phenomenon expressed in terms of force per unit area, such as pressure, sound waves, etc. Also the invention is sensitive to "strain" and equivalents thereof—that is, change of physical dimensions of a body with respect to the unit dimension of the body. Therefore, in general, the field effect structure acts as a transducer of mechanical to electrical energy.

It is to be understood that the invention is not limited to the use of any particular field effect structure such as shown.

Other objects and advantages, and even further modifications of the invention, will become apparent to those of ordinary skill in the art upon reading this disclosure. However, it is to be understood that this disclosure is illustrative of the invention, and not limitative thereof, the invention being defined by the appended claims.

What is claimed is:

1. A system comprising: a field effect structure having a source, a drain, a gate and a surface for receiving stress, and said structure having a conducting channel in which majority carriers move in response to an energy source, this channel being bound by a space charge created by an electric field produced from said gate; means for applying a voltage between said source and said drain and means for measuring the variation of the current flowing through said structure, as a function of the applied stress; means for applying a further voltage between said source and said gate for cancelling the current flowing through said structure as a function of said stress, said further voltage producing said electric field; and means for measuring said further voltage.

2. A system including an energy source, said system comprising:
at least two field effect structures, each of said structures having a source, drain, and at least one gate, and each of said structures having a conducting channel in which majority carriers move in response to said energy source, this channel being bound by a space charge created by an electric field produced from the said gate, at least one of said structures having a surface for receiving stress;
means for obtaining the difference between the currents respectively flowing through said structures, said current difference being a function of the stress received by said one structure;
means for cancelling the said difference; and
means responsive to said cancellation for indicating said stress.

3. A system as in claim 2 where both of said field effect structures have surfaces for receiving stresses and said current difference is a function of the difference between the stresses respectively received by said structures.

4. A system including an energy source, said system comprising:
at least two field effect structures, each of said structures having a source, drain, and at least one gate, and each of said structures having a conducting channel in which majority carriers move in response to said energy source, this channel being bound by a space charge created by an electric field produced from the said gate, at least one of said structures having a surface for receiving stress;
means for obtaining the difference between the currents respectively flowing through said structures, said current difference being a function of the stress received by said one structure;
means for cancelling the said difference; and
means responsive to said cancellation for indicating said stress;
including means for applying an electric voltage to the gates of each of said field effect structures thereby producing said electric field;
wherein said cancelling means comprises means for adjusting the voltage applied to one of said gates and said means responsive to said cancellation of said differences includes means for indicating the adjustment of said last-mentioned voltage required to effect cancellation, thereby providing said stress indication.

5. A stress measuring device including an energizing source, said device comprising: at least two field effect structures, each of said structures having a source, a drain, and at least one gate, and said structure having a conducting channel in which majority carriers move in response to said energy source, this channel being bound by a space charge created by an electric field produced from said gate, at least one of said structures having a surface for receiving stress, the output signal from said one structure being a function of said stress; and means responsive to the output signals from both of said structures for measuring said stress, said means including means for obtaining the difference of said signals, means for cancelling said difference, and means responsive to said cancellation for indicating said difference.

References Cited

UNITED STATES PATENTS

| | | | |
|---|---|---|---|
| 2,764,642 | 9/1956 | Shockley | 307—88.5 |
| 2,791,760 | 5/1957 | Rose | 307—88.5 |
| 2,866,014 | 12/1958 | Burns | 73—88.5 |
| 2,898,477 | 8/1959 | Hoestery | 73—88.5 |
| 2,929,885 | 3/1960 | Mueller | 73—88.5 |
| 3,056,636 | 11/1962 | Pfann | 73—88.5 |
| 3,114,867 | 12/1963 | Szekely | 317—235 |
| 3,144,522 | 8/1964 | Bernstein | 179—100.41 |
| 3,186,217 | 6/1965 | Pfann | 73—88.5 |
| 3,192,400 | 6/1965 | Statz et al. | 307—88.5 |

RICHARD C. QUEISSER, *Primary Examiner.*

J. J. GILL, *Examiner.*

C. A. RUEHL, *Assistant Examiner.*